Dec. 14, 1943.     R. S. BUCK     2,336,844
COORDINATE CONTROL
Filed Dec. 29, 1939     4 Sheets-Sheet 4
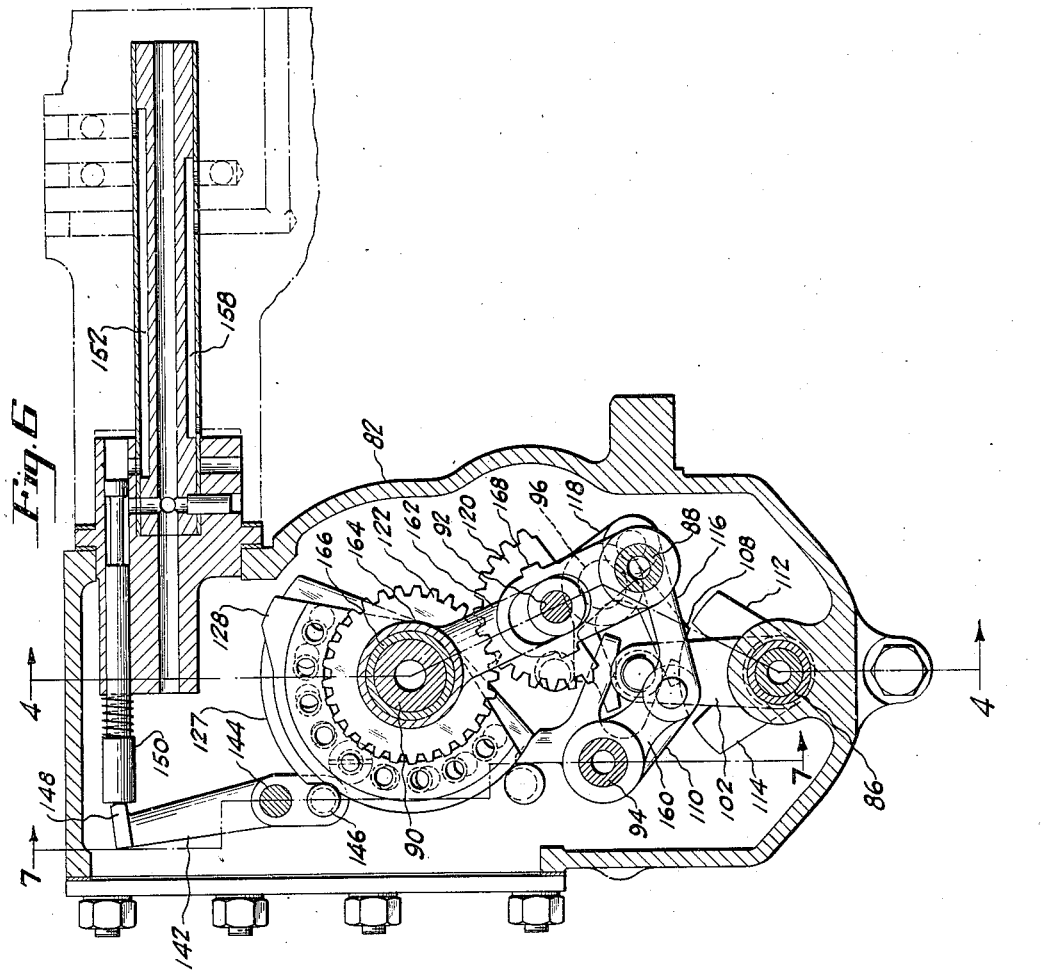
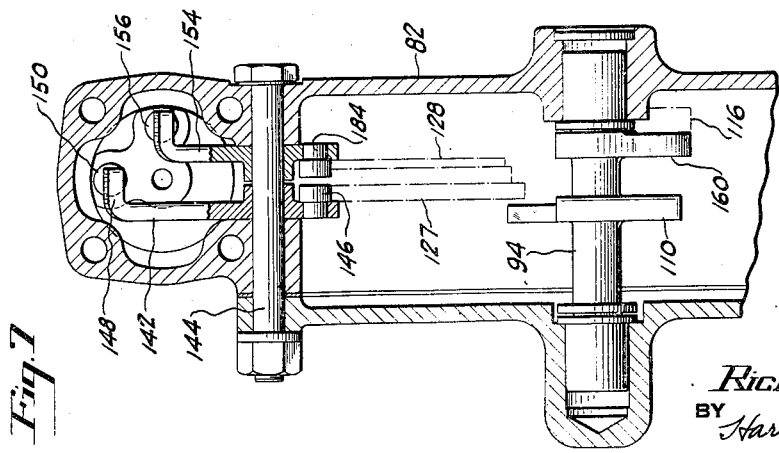
INVENTOR
*Richard S. Buck*
BY *Harris G. Luther*
ATTORNEY Patented Dec. 14, 1943

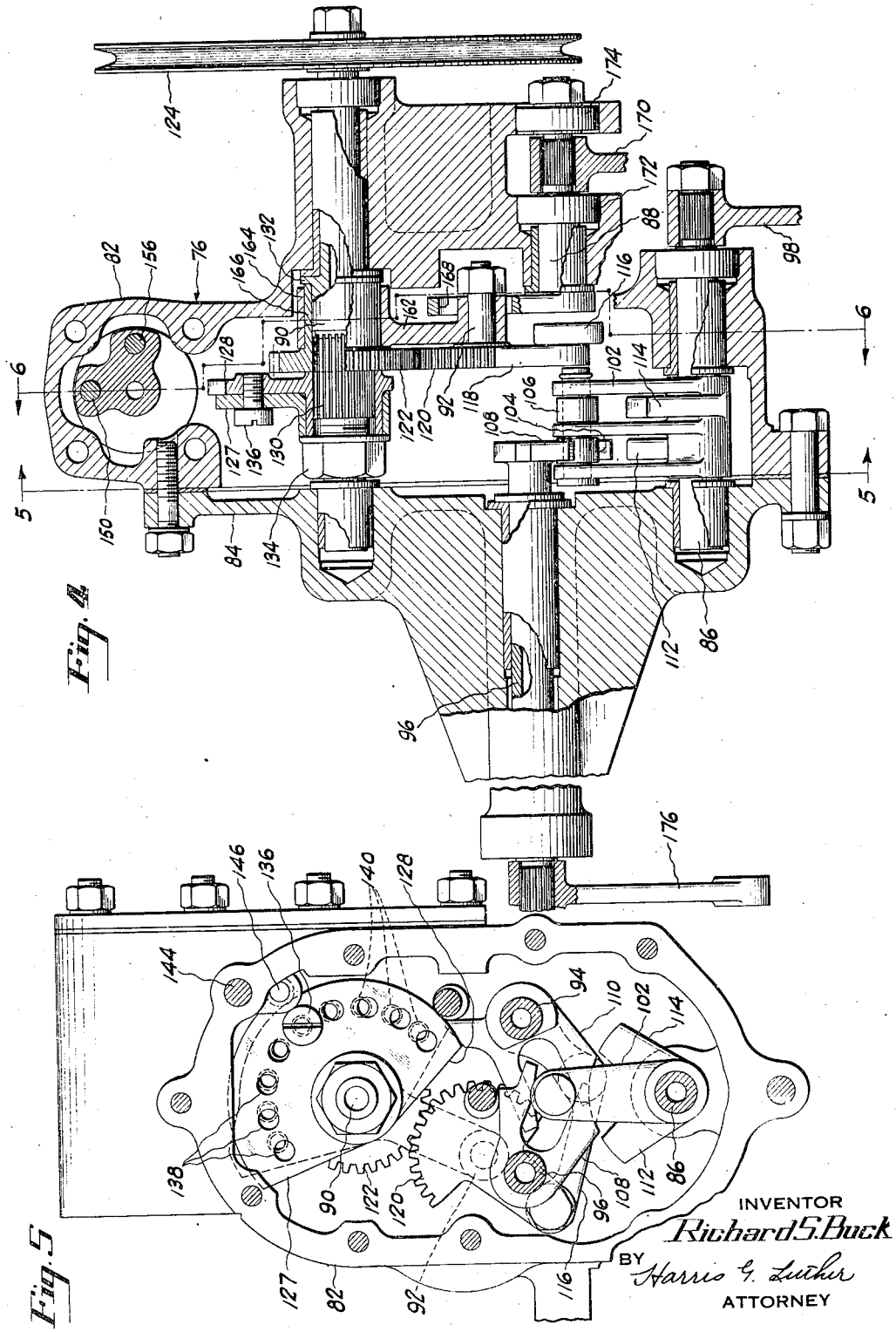

2,336,844

UNITED STATES PATENT OFFICE 2,336,844

COORDINATE CONTROL

Richard S. Buck, Glastonbury, Conn., assignor to United Aircraft Corporation, East Hartford, Conn., a corporation of Delaware Application December 29, 1939, Serial No. 311,515

12 Claims. (Cl. 170—135.6)

This invention relates to improvements in control means for aeronautical engine-propeller combinations and has particular reference to a control for a combination in which a supercharged engine drives a controllable-pitch governor controlled propeller.

An object of the invention resides in the provision of an improved control means of the character indicated which will simultaneously regulate the engine horsepower and the propeller pitch for particular airplane maneuvers such as take-off, climb and cruising.

A further object resides in the provision of improved means for simultaneously regulating the engine intake manifold pressure and the propeller pitch controlling governor in order that a desired engine performance for a particular maneuver may be repeated each time the particular maneuver is made.

A still further object resides in the provision of an improved control of the character indicated which imposes an automatic or semi-automatic regulation on the engine-propeller combination for certain predetermined maneuvers and restores the combination to manual control for other maneuvers or flight conditions.

Other objects and advantages will be more particularly pointed out hereinafter or will become apparent as the description proceeds.

In the accompanying drawings, in which like reference numerals are used to designate similar parts throughout, there is illustrated in three slightly varied forms a suitable mechanical application of the improved power plant control for the purpose of disclosing the invention. The drawings, however, are for the purpose of illustration only and are not to be taken as limiting the invention since it will be apparent to those skilled in the art that various changes in the illustrated constructions may be resorted to without in any way exceeding the scope of the invention.

In the drawings, Fig. 1 is a diagrammatic view of the improved control applied to an aeronautical engine-propeller combination.

Fig. 4 is a vertical sectional view through the operating element of the control mechanism taken along the line 4—4 of Fig. 6.

Fig. 5 is an end elevational view of a portion of the mechanism illustrated in Fig. 4 with the left hand end cover plate of Fig. 4 removed.

Fig. 6 is a sectional view on the line 6—6 of Fig. 4 looking in the direction of the arrows, and Fig. 7 is a sectional view on the line 7—7 of Fig. 6 looking in the direction of the arrows.

Figure 1:
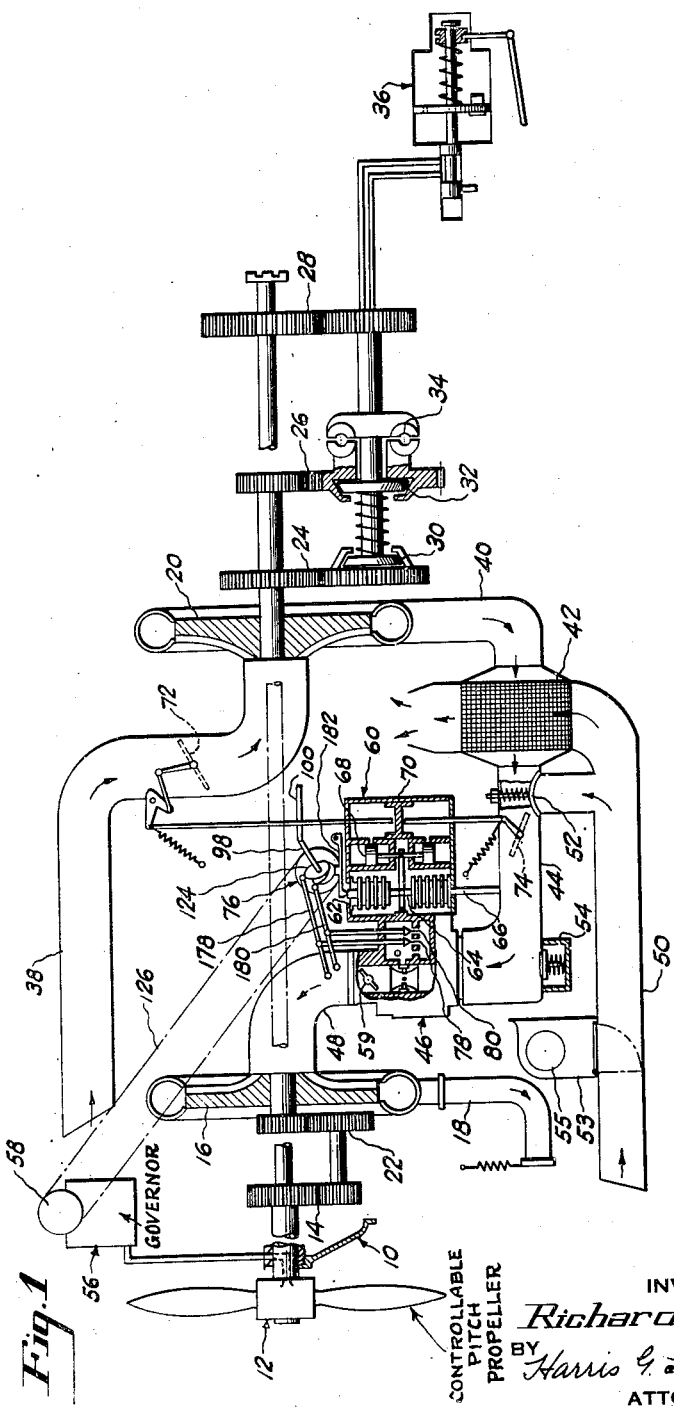

Referring to the drawings in detail, and particularly to Fig. 1, the numeral 10 generally designates an aircraft engine schematically indicated in the drawings by a fragmentary portion of its nosepiece. The engine drives the propeller, generally indicated at 12, either directly or through a suitable reduction gear and is provided with a main supercharger 16 connected with the engine intake manifold as indicated at 18, and may have a second stage or auxiliary supercharger 20 for maintaining the engine power at high altitudes. The main supercharger 16 may be driven through a suitable speed increasing gear train 14, 22, and the auxiliary stage supercharger may be driven through a change speed transmission including the gear trains 24, 26 and 28 and the clutches 30, 32 and 34. The speed at which the auxiliary supercharger 20 is driven by the change speed transmission may be controlled by the manually or automatically actuated selector valve, generally indicated at 36.

The auxiliary supercharger 20 may draw in air through the auxiliary stage intake 38 and discharge this air at an increased pressure through the duct 40 and intercooler 42 to the air intake 44 of the carburetor, generally indicated at 46. After passing through the carburetor and taking up a proportionate amount of fuel the air is fed through the inlet duct 48 to the main supercharger 16 from which it is distributed to the various intake manifold ducts 18.

When the auxiliary stage supercharger 20 is not operating the carburetor intake air may flow through the bypass inlet 50 and valve 52 to the carburetor air inlet 44 without flowing through the intercooler 42. The temperature of the air flowing through the duct 50 may be controlled by the heater 53 associated with the exhaust ring 55. A backfire door or valve 54 is provided on the bottom of the carburetor to relieve explosive pressures in the carburetor and avoid injury to the duct and intercooler system.

The propeller may be some one of various controllable-pitch propellers, a suitable example from the prior art being particularly illustrated and described in United States Patent No. 2,032,255 issued February 15, 1936, to Frank W. Caldwell for Propeller, and the governor 56 for controlling the propeller pitch may be of the form particularly illustrated and described in British Patent No. 470,284, issued to the Woodward Governor Company, accepted August 12, 1937, and the speed setting of this governor may be regulated by a control 58 in the manner particularly set forth in the British patent referred to above.

The pressure in the supercharger inlet 48 is regulated by a pressure responsive mechanism, generally indicated at 60, one form of which is particularly illustrated and described in United States Patent No. 2,170,974, issued August 29, 1939, to Wright A. Parkins et al. for Two-stage supercharger and a similar form of which is illustrated and described in United States Patent No. 2,116,876 issued May 10, 1938, to Guy E. Beardsley, Jr. et al. for Fuel feeding device for engines and contains a pressure responsive element comprising an evacuated bellows or "Sylphon" 62 connected through a link 64 with a similar bellows the interior of which is pneumatically connected with the interior of the air intake 44 through the tube or channel 66. Movements of the adjacent free ends of the bellows operate a valve 68 which controls a servo-motor 70 operatively connected with a throttle valve 72 in the auxiliary air intake 38 and a pressure regulating valve 74 in the carburetor air intake 44. In some installations the function of the valves 72 and 74 may be accomplished by a single valve and this single valve may be located at various positions along the engine intake air duct, either ahead of or with certain types of mixture controls behind the carburetor or other fuel metering device.

A manually operable regulating device, generally indicated at 76 and more particularly illustrated in Figs. 4 to 7, inclusive, is operatively connected with the throttle 59, the pressure regulator 60, the governor regulator 58 and the carburetor mixture regulating jets 78 and 80.

Reference may now be had to Figs. 4, 5, 6 and 7 for a more complete description of the construction and arrangement of the regulating element 76.

This element has a casing 82 one side of which is formed open and is closed by the removable cover plate 84. The casing 82 and cover plate 84 when assembled, as shown in Fig. 4, provide between them an elongated cavity into which extend a plurality of parallel shafts 86, 88, 90, 92, 94 and 96. The shaft 86 may be turned through a predetermined part of a revolution by the lever 98, operatively connected to the manually operable link 100 in Fig. 1, and is provided with a radially extending multiple arm 102 which carries rollers 104 and 106 at its outer end. These rollers engage respective slotted levers 108 and 110 fixed respectively to the shafts 96 and 94, as is particularly shown in Fig. 5. With the arrangement shown in Fig. 5, rotation of the shaft 86 in one direction from the neutral position there illustrated, will cause the respective roller to engage one of the levers 108 or 110 and rotate the respective shaft 96 or 94 without movements of the alternative shaft. Arms 112 and 114 are provided on the shaft 86, the purpose of the arm 112 being to hold the lever 108 in position to be reengaged by the roller 104 as the arm 102 is returned from a movement in which it rotates the shaft 94, during which movement the roller 104 would temporarily move out of the slot in the arm 108, and the arm 114 is provided to similarly insure the reengagement of the roller 106 in the arm 110 when the arm 102 is returned from a movement rotating the shaft 96. The shaft 94 is connected through a link 116 with one end of a lever member 118 pivotally mounted intermediate its length on the bolt or shaft 92 and provided at its end opposite that connected to the link 116 with a gear segment 120 provided with gear teeth which mesh with the teeth of a gear 122 splined onto the shaft 90 whereby the shaft 90 will be rotated upon rotational movement of the shaft 94 by rotational movements of the arm 102 in a clockwise or right hand direction as viewed in Fig. 5. The shaft 90 projects at one end outside of the casing 76 and carries on this projecting end a cable pulley 124 connected by suitable means such as the cable 126, shown in Figs. 1, 2 and 3, with the governor control pulley 58. The shaft 90 also carries a pair of cam members 127 and 128, one of which, for example, the cam member 128, is splined to the shaft through the same splines 130 which secure the gear 122 against rotation relative to the shaft. The gear 122 and cam member 128 are held in position lengthwise of the shaft by suitable means such as the integral shoulder 132 and the nut 134 screw threaded onto the shaft, and the cam member 127 is held against rotation by means of a suitable connection with the cam member 128 such for example as the locking screw 136. As is particularly shown in Fig. 6, both cam members are provided with a plurality of screw receiving apertures, 138 in the cam member 127, and 140 in the cam member 128, and these holes are unevenly spaced in the two cam members to provide a vernier adjustment for the cam 127 relative to the cam 128, the spacing being such that the cams may be adjusted relative to each other at intervals of approximately fifty revolutions per minute of engine speed, as will appear later. A pivoted lever member 142, particularly shown in Figs. 6 and 7, and pivotally mounted intermediate its length on a shaft or bolt 144 carried by the casing 82, carries at one end a pin or roller 146 engaging the cam 127, and at its opposite end an abutment 148 cooperating with a valve 150 which controls an oil lead 152 leading to one of the carburetor fuel mixture control jets 78 or 80. A similar lever 154, mounted on the same shaft 144, cooperates with the cam 128 and controls a valve 156 which controls a fluid passage 158 leading to the other mixture control jet.

As is particularly shown in Fig. 6, the link 116 is connected to the free end of an arm 160 fixed on the shaft 94 for rotating the gear structure 120 about the pivot 92. The pivot member 92 is carried at one end of an arm 162 the opposite end of which is provided with a cylindrical portion 164 surrounding a bearing extension 166 provided on the gear 122. This pivot is engaged by a slotted arm 168 fixed on the end of the shaft 88 to which is also fixed a manual control arm 170 disposed between the bearings 172 and 174.

The operation of this coordinate control element may be substantially as follows:

The position of the arm 102 illustrated in Fig. 5, is the position corresponding to the proper setting of the carburetor and propeller for cruising at wide open throttle. The engine idling position of this arm would be the limiting left hand position, considering the arm to be rotated in a counterclockwise direction from the position illustrated in Fig. 5. Assuming now that the arm 102 is in its limiting left or engine idling position and that the airplane equipped with the coordinate control of this invention is on the ground prepared for flight, in order to attain take-off conditions the pilot will rotate the shaft 86 through the intermediacy of the lever arm 98 and manually actuatable link 100 to move the arm 102 in a clockwise direction from its limiting left hand position to its limiting right hand position. From its limiting left hand position to the intermediate position illustrated in Fig. 5 the arm 102 rotates the throttle control shaft 96 through the intermediacy of the roller 104 and slotted arm 108 to bring the throttle 59 from its idling position to its wide open or full power position, the shaft 96 being connected with the throttle valve through a suitable linkage including the arm 176 of Fig. 4. When the throttle has been brought to its wide open position the roller 104 leaves the slot in the arm 108 and the cam elements 112 engages the arm 108 to maintain the shaft 96 in wide open throttle position. As clockwise movement of the arm 102 is continued the roller 106 enters the slot in the arm 110 and begins to rotate the shaft 94. This shaft, through the connecting link 116, rotates the gear sector 120 which in turn rotates the gear 122 and the shaft 90. Rotation of the shaft 90 causes a rotation of the governor control pulley 124 in a direction to change the setting of the governor in a speed increasing, or propeller pitch decreasing, direction thus permitting the engine speed at wide open throttle to increase in order that the engine may develop additional power for the take-off effort. As the shaft 90 rotates, the cam 127 will engage the pin 146 and move the lever 142 to change the position of the valve 150 and apply oil pressure to the channel 152. This oil pressure will open one of the additional fuel mixture control jets, for example the jet 78. Under certain conditions and if found desirable this oil pressure may also be utilized to simultaneously change the setting of the automatic carburetor intake pressure control 60 to establish a higher air pressure in the carburetor air intake thus increasing the supercharging effect on the engine and consequently increasing its power output. This later operation is, however, not the present preferred form. The operation of the cams 127 and 128 has been schematically illustrated in Fig. 1 by the mechanical levers 178 and 180, the lever 178 acting to open the jet 78 and the lever 180 acting to open the jet 80 and the lever 182 acting to change the setting of the pressure control 60 as the governor control pulley 124 is rotated. Continued movement of the arm 102 in the clockwise direction mentioned above, eventually brings the cam 128 into contact with a pin 184, similar to the pin 146, in the end of the lever 154 causing this lever to actuate the valve 156. Actuation of the valve 156 causes fluid pressure to be supplied through the line 158 to open the other fuel mixture control jet, for example the jet 80, thus richening the engine mixture for maximum power operation. In the now preferred form, actuation of the valve 156 will also act to simultaneously change the setting of the air pressure regulating device 60 to cause the valves 72 and 74 to maintain an increased pressure in duct 44. The power plant, including the engine and propeller, will now be operating under take-off conditions and the arm 102 may be left in its limiting right hand position until the take-off has been accomplished and sufficient altitude has been gained.

When a safe altitude has been gained the link 100 may be actuated to move the arm 102 in a counterclockwise direction until the cam 128 is disengaged from the lever 154. This will permit closing of one of the additional fuel jets and slightly decreasing the pressure in duct 44 will slightly change the governor setting to decrease the engine speed leaving the engine and propeller in condition for climb with a relatively high speed governor setting and one additional fuel jet over those required for cruising. When the airplane has reached a safe altitude for cruising and the pilot desires to level off and begin cruising operation he will actuate the control 100 to move the arm 102 in the counterclockwise direction until the cam 127 has become disengaged from the lever 142. This operation will further change the governor setting toward a lower engine speed and incidental higher propeller pitch condition and will simultaneously close the valve 150 to shut off the fluid pressure from the additional fuel jet. This will bring the fuel mixture ratio down to the predetermined economy value for cruising and leaving the engine in condition for cruising at wide open throttle. If the pilot wishes to cruise at less than wide open throttle he may continue the counterclockwise movement of the lever 102 until the roller 104 picks up the arm 108 and turns the shaft 96 to reduce the throttle opening to the desired setting. This additional movement of the arm 102 will not, however, change the governor setting, the fuel mixture, or the carburetor air intake pressure and all of these factors will remain at predetermined cruising values designed to give a maximum power plant efficiency and economy. However, if at any time the pilot wishes to change the governor setting, he may do so by actuating a manual control connected with the arm 170 on the shaft 88. The consequent rotation of the shaft 88 will swing the arm 168 to move the pivot 92 of the gear sector 120 with a consequent rotation of the shaft 90 and governor control pulley 124 through the intermediacy of the gear 122. These manual governor adjustments will usually be maintained within a range such that the cams 127 and 128 will not be brought into contact with the respective levers 142 and 154 by the manual rotation of the shaft 90 as it will not usually be desired to manually change the mixture control and carburetor intake air pressure in connection with these manual governor setting adjustments. It can, however, be made optional whether or not the pilot shall have manual control of the fuel mixture and the carburetor air intake pressure. The coordinate control always leaves the governor setting at some intermediate speed value so that, when the throttle is moved to an engine idling position the governor, in its effort to keep the engine speed up to the intermediate value, will change the propeller to its low pitch condition in which propeller condition the engine may easily and quickly accelerate from its idling speed up to the intermediate speed at which the governor would begin to increase the propeller pitch.

In the application shown in Fig. 1 the coordinate control unit 76 may control only the governor, the fuel mixture control jets and the carburetor air intake pressure, the throttle 59 being left subject to manual control. This may be accomplished by omitting the arm 108 in Fig. 4 and connecting a manual control linkage to the arm 176, or by other suitable means.

Figure 2:
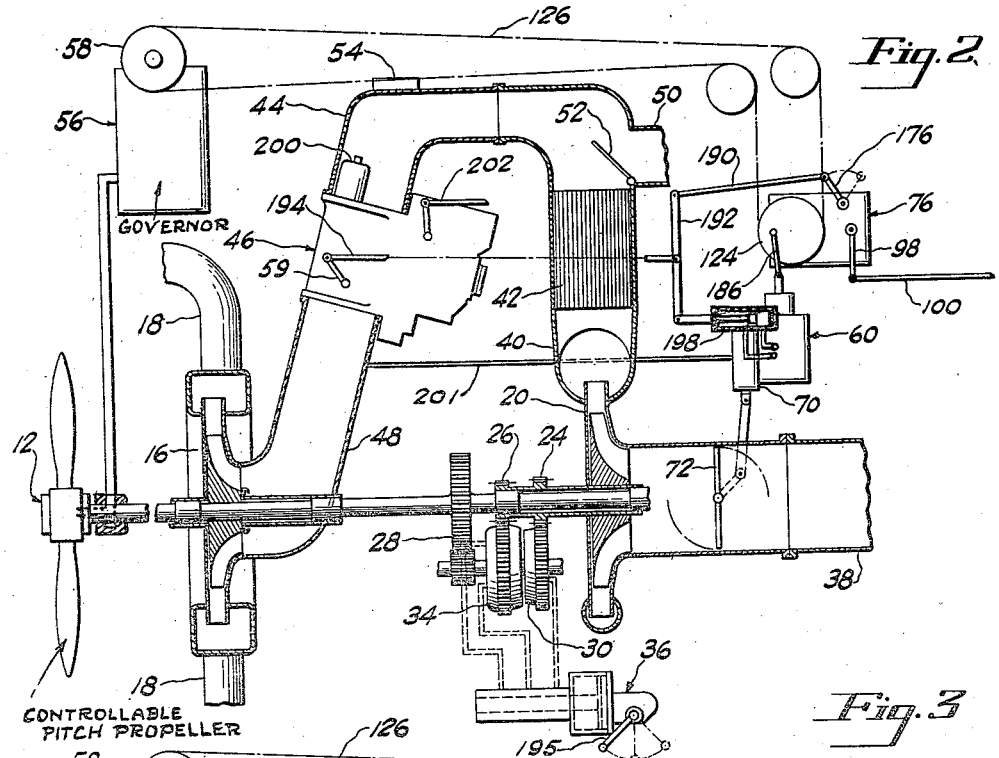
Fig. 2 is a diagrammatic view similar to Fig. 1 showing a somewhat different arrangement of the improved power plant control.

In the application shown in Fig. 2, the coordinate control unit 76, operable by the manual control 100, is operatively connected with the adjusting means 58 of the speed governor 56, the engine throttle 59 and the adjusting means of the intake air pressure control 60. In this arrangement the fuel mixture ratio is regulated by an automatic control including the temperature compensator 200, various forms of which are known to the art, a suitable embodiment being illustrated and described in British Patent No. 523,895, complete accepted July 25, 1940, and the throttle 59 performs the double function of controlling the engine power output and regulating the pressure in the engine intake to maintain the intake pressure substantially constant at the value required for rated engine power and to prevent the intake pressure from exceeding a safe maximum value. A manually operable fuel mixture control 202 is also provided so that the fuel mixture ratio can be manually adjusted in case the altitude range of the automatic control 200 is exceeded or the automatic control becomes inoperative. This means that, in this case, the throttle must be subject to control both by the manual power control and by the automatic pressure regulator and that the pressure regulator must be pneumatically operated with the intake at some point on the down-stream side of the throttle where the intake pressure is affected by the action of the throttle. Such a connection is diagrammatically indicated at 201. The throttle connections include a differential bar 192 connected at one end, by means of a pivoted link 190, to the manually actuated arm 176 of the coordinate control unit 76, and connected at its other end to the motor 198 of the automatic pressure control 60. Intermediate its length this bar 192 is connected by means of the pivoted link 194 with the throttle 59. With this arrangement, when the throttle is moved manually the pressure control 60, through its motor 198, will try to make a compensating movement to maintain the intake air pressure constant, the arrangement being such that the throttle cannot be manually opened to a position at which the safe intake pressure, as determined by the control 60, is exceeded, but has a range of movement under manual control in a closing direction greater than the range of compensating movements of the motor 198 so that the throttle can be manually closed after the motor has reached its limiting position. When the manual control has been brought to what corresponds to its wide open throttle position the throttle still has a range of movement under control of the pressure control 60 to maintain the intake pressure at the value for which the control is set. After the manual control has been moved to the above-mentioned position corresponding to wide open throttle operation a further increase in engine power can be obtained by adjusting the speed governor 56 to increase the engine speed and by adjusting the intake pressure control 60 to maintain a higher air pressure in the engine intake. This function is obtained by connecting the governor adjusting means and the adjusting means of the intake pressure control to a part of the coordinate control 76 that begins to move under actuation of the manual control 100 after the arm 176 has completed its throttle opening movement.

If the engine is to be used at high altitudes it may be provided with an auxiliary supercharger 20 having a control valve 72 also connected with the motor 198 in a manner, as particularly illustrated and described in United States Patent No. 2,170,974 referred to above, such that when the automatic intake pressure control has moved the throttle 59 to its wide open position, corresponding to the critical altitude of the supercharger 16, it may start opening the valve 72 to render the auxiliary supercharger 20 effective to maintain the intake pressure for which the pressure control is set through an additional increase in altitude. When the critical altitude is reached at which both throttle and the valve 72 are wide open, a further boost in supercharging may be obtained by operating the change speed gear, including the elements 24, 26, 28, 30 and 34, to increase the speed of the auxiliary supercharger. This change of speed may be obtained by operating the actuating lever 195 of the control valve 36. While this lever 195 could be operatively connected to the coordinate control 76 or the automatic pressure regulator 60, since it would normally be used only under conditions of flight at extremely high altitude, it has been considered preferable to leave this lever subject to direct manual control.

Figure 3:
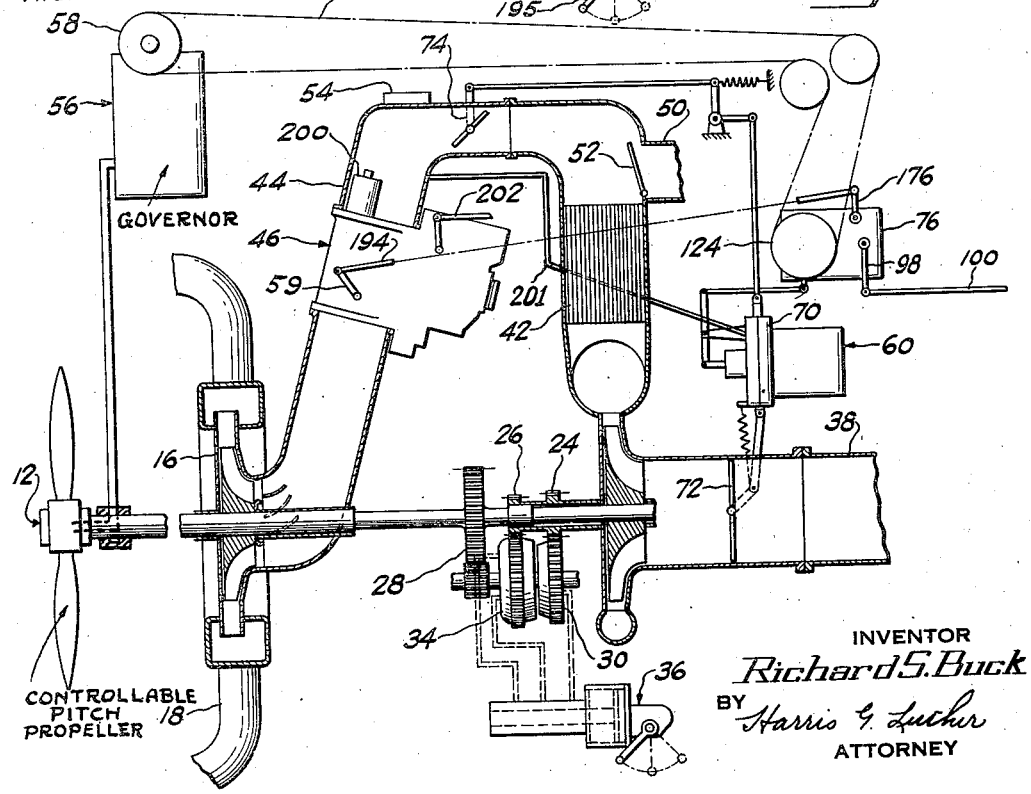
Fig. 3 is a diagrammatic view similar to Fig. 1 showing a still further modified form of the improved power plant control.

In the arrangement shown in Fig. 3, the construction and operation of the power control is substantially the same as that illustrated in Fig. 2, and described above except that an extra valve 74 is provided in the intake conduit upstream from the fluid metering device or carburetor 46 to regulate the intake pressure under control of the automatic intake pressure control device 60. The throttle is connected directly with the manually actuatable lever 176 of the coordinate control unit 60 and the valve 74 is operatively connected with one end of the motor 70 of the automatic intake pressure control; the opposite end of the motor being connected to the auxiliary stage control valve 72. The maximum available power at various altitudes and at a definite engine speed is controlled by the valves 74 and 72 under actuation of the pressure control 60 and the gear shift control 36 although additional power may be made available by changing the settings of the speed governor and the intake pressure control, and the power output of the engine may be limited to less than the maximum available by manual operation of the throttle 59.

While a suitable mechanical embodiment for the purpose of disclosing the invention and three slightly different methods of application of the device of the invention to power plant controls has been hereinabove described and illustrated in the accompanying drawings, it is to be understood that the invention is not limited to the mechanical embodiment or to the various applications so illustrated and described, but that such changes in the size, shape and arrangements of the various parts and in the application of the control device to the various power plant control instrumentalities may be resorted to as come within the scope of the sub-joined claims.

Having now described the invention so that others skilled in the art may clearly understand the same, what it is desired to secure by Letters Patent is as follows:

1. In combination with an engine having a load controlling speed responsive governor, a throttle, and an intake air pressure regulator, an engine power controlling device comprising, means for opening and closing said throttle and means for automatically adjusting said governor and said air pressure regulator to increase the engine speed and intake air pressure when operation of said power controlling device in a power increasing direction is continued after said throttle has been brought to its fully open position, and a single manual control for both of said means.

2. In combination with an engine having, a carburetor equipped with a throttle and at least one fuel mixture control jet, an adjustable intake air pressure regulator, and an adjustable load varying speed governor, an engine power controlling device comprising, means for opening and closing said throttle, means for changing the speed setting of said governor, means for opening and closing said fuel mixture control jet, means for changing the pressure setting of said intake pressure control, and manually actuatable means operatively connected with said above-mentioned means operative in one part of its range of movement to completely open and close said throttle and in a separate and entirely sequential range of movement to adjust said governor and said intake pressure control and open or close said jet.

3. In combination with a power plant including an engine equipped with a carburetor having a throttle, an intake air pressure regulator and a fuel mixture control, and an engine driven controllable-pitch propeller equipped with a speed governor, a coordinate control for said power plant comprising, a throttle adjusting mechanism, and mechanism for simultaneously adjusting said governor, said air pressure regulator and said fuel mixture control, a single manual actuator for said coordinate control, and means connecting said actuator with said adjusting mechanism so constructed and arranged that said actuator can move but one of said adjusting mechanisms at a time.

4. The arrangement as set forth in claim 3 in which said connecting means comprises, a slotted arm operatively connected with each mechanism, a pivoted arm rotatable by said actuator, and means carried by said pivoted arm for engagement in the slots in said slotted arms.

5. The arrangement as set forth in claim 3 in which said connecting means comprises, a slotted arm operatively connected with each mechanism, a pivoted arm rotatable by said actuator, and means carried by said pivoted arm for engagement in the slots in said slotted arms so associated with said means that movement of said manual control from one end of its range of movement to the other first brings the throttle to its fully open position and then adjusts the governor to provide an increased engine speed while simultaneously adjusting said air pressure control to increase the carburetor intake air pressure and the fuel mixture control jets to supply additional fuel to the engine, and that movement of said manual control in the opposite direction first restores the speed setting of the governor, the carburetor intake air pressure and the fuel mixture ratio to their original values and then moves the throttle towards its closed position.

6. Engine power control means comprising, a hand control lever, an engine air intake control, an engine speed governor setting control, a member for actuating said intake control, a member for actuating said governor speed setting control, and a member actuated by said hand lever and engageable alternatively with said intake control actuating member and said speed governor control actuating member and operative when said hand lever is moved in one direction from one limiting position to first move said intake control through its entire range of movement and then move said speed governor control, and when said hand lever is moved in the opposite direction from its opposite limiting position to first move said speed governor control from a high speed setting to an intermediate speed setting and then move said air intake control without imparting further movement to said speed governor control.

7. In combination with an engine having a throttle, an adjustable automatic intake pressure regulator, and an adjustable load varying speed governor, engine power control means comprising, a hand lever, an actuating element movable by said hand lever, a first actuated element operatively connected with said throttle and disposed adjacent to said actuating element, a second actuatable element operatively connected with the adjusting means of said speed governor and with the adjusting means of said intake pressure regulator and disposed adjacent to said actuating element, and means on said actuating element operatively engageable alternatively with said first and second actuated means whereby said hand lever will within one range of movement control only said throttle and will within a different range of movement control said speed governor and said intake pressure regulator to the exclusion of said throttle.

8. In combination with an engine having a throttle, an adjustable intake pressure regulator, a fuel mixture ratio control, and an adjustable load varying speed governor; engine power control means comprising, a hand lever, an actuating element movable by said hand lever, a first actuated element operatively connected with said throttle and disposed adjacent to said actuating element, a second actuated element operatively connected with the adjusting means of said intake pressure regulator, with said fuel mixture ratio control and with the adjusting means of said speed governor and disposed adjacent to said actuating element, and means on said actuating element operatively engageable alternatively with said first and second actuated means, whereby said hand lever will within one range of movement adjust said throttle only and will, within a different range of movement, adjust said intake pressure regulator, said fuel mixture ratio control and said speed governor to the exclusion of said throttle.

9. In combination with an engine having a throttle and an adjustable speed responsive governor, engine power control means comprising, a hand lever, an actuating element movable by said hand lever, a first actuated throttle adjusting element operatively connected with said throttle and disposed adjacent to said actuating element, a second actuated governor adjusting element operatively connected with the adjusting means of said speed responsive governor and disposed adjacent to said actuating element, means on said actuating element engageable alternatively with said first or said second actuated element whereby movements of said hand lever in different operative ranges will adjust either said throttle or said speed governor, and manually operable means for adjusting said speed responsive governor independently of said hand lever and said actuating element.

10. In combination with an engine having a throttle, an adjustable intake pressure regulator, a fuel mixture ratio control operable in two successive steps, and an adjustable load varying speed governor, engine power controlling means comprising, a manually actuatable means for controlling said throttle, and other manually actuatable means for changing the speed setting of said governor, simultaneously operating said fuel mixture ratio control to change the fuel mixture ratio first by one step and then by the other, and for changing the pressure setting of said intake control when the step in the operation of said fuel mixture ratio control providing the richest fuel mixture ratio is brought into or out of operation.

11. A power control apparatus for an engine having a throttle, an adjustable intake pressure regulator, a fuel mixture control, and an adjustable load varying speed governor, said apparatus comprising; a hand lever, an actuating element movable by said hand lever, actuated elements operatively engaged by said actuating element and effective to adjust said intake pressure regulator, said fuel mixture control and said governor, and an independent manual control for said throttle.

12. A power control apparatus for an engine having a throttle, an adjustable intake pressure regulator, a fuel mixture ratio control, and an adjustable load varying speed governor, said apparatus comprising; a hand lever, an actuating element movable by said hand lever, and actuated elements operatively engaged by said actuating element and effective to adjust said intake pressure regulator and said fuel mixture control, additional manually operated means for adjusting said governor and an independent manual control for said throttle.

RICHARD S. BUCK.